United States Patent [19]
Hahn et al.

[11] 3,937,753
[45] Feb. 10, 1976

[54] ACID DYEABLE POLYESTERS

[75] Inventors: Maneung Hahn, Akron; Leroy C. T. Lin, Uniontown; William C. T. Tung, Tallmadge, all of Ohio

[73] Assignee: The Goodyear Tire & Rubber Company, Akron, Ohio

[22] Filed: Jan. 23, 1975

[21] Appl. No.: 543,399

[52] U.S. Cl............................. 260/860; 260/75 N
[51] Int. Cl.²................ C08G 63/36; C08L 67/02
[58] Field of Search.......................... 260/860, 75 N

[56] References Cited
UNITED STATES PATENTS

| | | | |
|---|---|---|---|
| 3,397,253 | 8/1968 | Merten et al. | 260/860 |
| 3,595,938 | 7/1971 | Weissermel et al. | 260/860 |
| 3,651,172 | 3/1972 | Barkey et al. | 260/860 |
| 3,856,754 | 12/1974 | Habermeier et al. | 260/75 N |

OTHER PUBLICATIONS

Di–2–Carboxyethyl Dimethyl Hydantoin., S–2572, *Technical Bulletin*, Dantocon TMPCE., Glycol Chemicals Inc., Williamsport, Penn. Nov. 30, 1972.

*Primary Examiner*—Murray Tillman
*Assistant Examiner*—Thurman K. Page
*Attorney, Agent, or Firm*—F. W. Brunner; J. M. Wallace, Jr.

[57] ABSTRACT

The invention relates to polyester resin modified with hydantoin diacid or hydantoin diol and cyclohexyl diethanolamine. The copolyesters are dyeable with acid type dyes to form brightly colored fibers and fabrics.

9 Claims, No Drawings

ACID DYEABLE POLYESTERS

This invention relates to a method of making new highly polymeric copolyester resins that are capable of being dyed with acid type dyes, to the new block copolyester resins and products made therefrom.

Polyester resins, such as polyethylene terephthalate, have no attraction for acid type dyes. This somewhat limits the type of fabrics in which the polyester is used.

It is an object of the invention to provide a shaped article from polyester having an affinity for said dyes.

Acid dyes, also known as anionic dyes, are organic acid salts generally represented as $D - SO_3^- Na^+$. The acid dyes are known to be very bright colored. They are used in dyeing wools and polyamides (nylons). It is a purpose of this invention to provide modified polyesters that will accept acid dyes to form bright colored shaped articles such as fibers, films and molded articles.

In accordance with the present invention it has been found that a copolyester comprised of blocks of polyethylene terephthalate joined by blocks of a hydantoin diacid-cyclohexyl diethanolamine polymer or blocks of a hydantoin diacid-cyclohexyl diethanolamine polymer modified with another glycol such as hydantoin diol or a polymethylene glycol containing from 2 to 10 methylene groups or a diol such as Carbowax (polyethylene glycol ether) or Polymeg (polytetramethylene glycol ether) have good dyeability with acid dyes and excellent properties.

Hydantoin diacid or hydantoin diols are compounds having the structure shown in the following chemical formula:

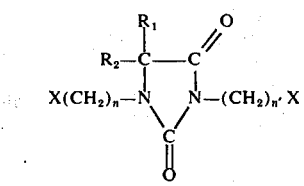

where $R_1$ and $R_2$ are H or the same or different hydrocarbon radicals selected from the group consisting of alkyl, aryl, alkaryl, aralkyl and heterocyclic radicals, $n$ and $n'$ are integers from 1 to 6 and X is an ester forming radical such as —OH or —COOH radicals.

Representative examples of derivatives of hydantoin useful in the invention are:

di(2-hydroxyethyl) dimethyl hydantoin
di(3-hydroxypropyl) dimethyl hydantoin
di(4-hydroxybutyl) dimethyl hydantoin
di(2-hydroxyethyl) diethyl hydantoin
di(2-hydroxyethyl) dipropyl hydantoin
di(2-hydroxyethyl) di-t-butyl hydantoin
di(2-hydroxyethyl) diphenyl hydantoin
di(2-hydroxyethyl) phenyl hydantoin
di(2-hydroxyethyl) methyl phenyl hydantoin
di(2-carboxymethyl) dimethyl hydantoin
di(2-carboxyethyl) dimethyl hydantoin
di(3-carboxypropyl) dimethyl hydantoin
di(4-carboxybutyl) dimethyl hydantoin
di(2-carboxyethyl) dimethyl hydantoin
di(2-carboxyethyl) dipropyl hydantoin
di(2-carboxyethyl) di-t-butyl hydantoin
di(2-carboxyethyl) diphenyl hydantoin
di(2-carboxyethyl) methyl phenyl hydantoin
di(2-carboxyethyl) benzyl hydantoin
di(2-carboxyethyl) tryptophan hydantoin
di(2-carboxyethyl) tryptophan hydantoin The amount of the above modifying agent incorporated in the polymer is dependent on the depth of shade of the finished products desired and/or the original polyester properties to be retained. Generally 2 to 20 percent by weight, preferably 5 to 15 percent by weight of modifying polyester based on the weight of the copolymer results in a desirable shade with good physical properties in the products. The modifying polymer blocks used have an average degree of polymerization in the range of from about 2 to about 20.

EXAMPLE 1

Hydantoin Diacid-Hydantoin Diol Cyclohexyl Diethanolamine Polymer 54.5 Grams di(2-carboxyethyl) dimethyl hydantoin, 21.6 grams di(2-hydroxyethyl) dimethyl hydantoin, 17.3 grams cyclohexyl diethanolamine, 0.01 gram $H_2SO_4$ and 0.005 gram $ZnAc_2$ were heated in a glass reactor for two hours at 0.5 millimeter of mercury pressure at 160° C. and then the temperature was raised to 190° C. The product formed was a lower molecular weight polymer having a light tan color.

EXAMPLE 2

Melt Blending of Hydantoin Diacid/Cyclohexyl Diethanolamine Block with Polyethylene Terephthalate 45 Grams of high molecular weight polyethylene terephthalate having an intrinsic viscosity (I.V.) of 0.75 as determined in a phenol-tetrachloroethane (60/40) mixed solvent at 30.0° C., said ethylene terephthalate containing antimony trioxide catalyst, were melted and then 5 grams of the polymer prepared in Example 1 were added. The molten mixture was heated and mixed for eight minutes at 0.5 millimeter of mercury pressure.

Fibers from the molten polymer were drawn by hand to approximately four times their original length. The fibers were dyed to a deep color with Acid Red 4 using the following method:

PROCEDURE FOR DYEING

A dye bath was made up with 2 percent by weight of Acid Red 4 dyestuff based on the weight of fiber being dyed. The total liquor to fiber ratio was maintained throughout the period at 50:1. The pH of the dye bath was adjusted to 4 by addition of sulfuric acid and a few drops of dispersing agent Triton X-100 were added. The dye bath was heated to boil and the fiber was added. Frequent agitation with a glass rod was necessary to ensure even level dyeing. The normal dyeing period is 90 minutes at boiling temperature.

EXAMPLE 3

54.4 Grams di(2-carboxyethyl) dimethyl hydantoin, 35.0 grams cyclohexyl diethanolamine, 0.01 gram $ZnAc_2$ and 0.01 gram $Sb_2O_3$ were heated in a glass reactor for two hours at 0.5 millimeter of mercury pressure at 160° C. and then the temperature raised to 190° C. to polymerize the product. The product after condensation polymerization for about one hour was a low molecular weight polymer, viscous liquid at room temperature and somewhat yellow in color.

EXAMPLE 4

Blending with Polyethylene Terephthalate

45 Grams of heel of low molecular weight polyethylene terephthalate polymer containing $Sb_2O_3$ was polymerized to high molecular weight (I.V. 0.75). Then 5 grams of the low molecular weight polymer prepared above in Example 3 was added and the mixture stirred for eight minutes at 0.5 millimeter of mercury pressure and 280° C.

Fibers drawn from the copolymer were dyed with Acid Red 4 to a deep red shade.

The term "intrinsic viscosity" is used herein as a measure of the degree of polymerization of the polymer. It is defined as follows:

$$\text{I.V.} (\eta) = \lim_{C \to 0} \left( \frac{\ln \eta_r}{C} \right)$$

wherein $\eta_r$ is the viscosity of a dilute 60/40 phenol/tetrachloroethane mixed solvent solution of the polymer divided by the viscosity of the 60/40 phenol/tetrachloroethane mixed solvent itself measured under the same conditions as the polymer solution and C is the concentration of the polymer in grams per 100 cubic centimeters of solution. The intrinsic viscosity data were obtained by determining the viscosity of a solution of 0.4 gram of the polymer dissolved in 100 cubic centimeters of the 60/40 phenol/tetrachloroethane and the viscosity of the mixed solvent at 30° C. and making the calculations necessary.

In the preparation of the polymeric polyesters, the preparation of the glycol esters and the polymerization are, in general, carried out in accordance with usual known techniques. Thus the reactions are preferably carried out in the absence of oxygen, generally in an atmosphere of an inert gas such as nitrogen or the like in order to lessen darkening and to make it possible to obtain a high molecular weight pale or colorless product. The polymerization or condensation reaction is carried out at reduced pressure, generally below 10 Torr and usually at or below one Torr, at a temperature in the range of from about 260° to 290° C. The high molecular weight resin formed has an intrinsic viscosity of at least 0.3 and usually 0.4 or higher as determined in a 60/40 phenol/tetrachloroethane mixed solvent at 30° C.

Various catalysts can be used. Where ester interchange reactions are involved suitable catalysts are catalysts such as zinc acetate, manganese acetate, lead acetate and litharge. Also, various catalysts can be used for the condensation polymerization reaction. Suitable catalysts are antimony trioxide, litharge, lead acetate, glycol soluble compounds of titanium and glycol soluble compounds of cobalt.

Yarns produced from the copolyesters of the present invention are suitable for use in various applications. They are readily dyed with acid type dyes to deep shades.

While certain representative embodiments and details have been shown for the purpose of illustrating the invention it will be apparent to those skilled in this art that various changes and modifications may be made therein without departing from the spirit or scope of the invention.

What we claim is:

1. A block polymer containing blocks of polyethylene terephthalate and polymer blocks selected from the group consisting of (A) blocks of a polymer of diacid having the hydantoin nucleus in its structure and cyclohexyl diethanolamine and (B) blocks of a polymer of diacid having the hydantoin nucleus in its structure and a mixture of cyclohexyl diethanol amine and a diol selected from the group consisting of hydantoin diol, a polymethylene diol containing from 2 to 10 methylene groups and polyether diols.

2. The polymer of claim 1 in which the hydantoin materials have the general formula

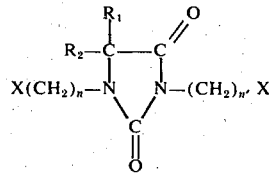

where $R_1$ and $R_2$ are H or the same or different hydrocarbon radicals selected from the group consisting of alkyl, aryl, alkaryl, aralkyl and heterocyclic radicals, n and n' are integers from 1 to 6 and X is —OH in the hydantoin diol and X is —COOH in the hydantoin diacid.

3. The polymer of claim 1 in which the hydantoin diacid has the general formula

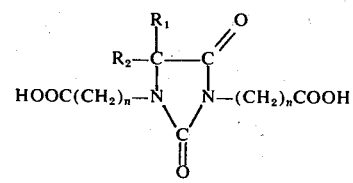

where $R_1$ and $R_2$ are H or the same or different hydrocarbon radicals selected from the group consisting of alkyl, aryl, alkaryl, aralkyl and heterocyclic radicals and n and n' are integers from 1 to 6.

4. The polymer of claim 1 in which the hydantoin diol has the general formula

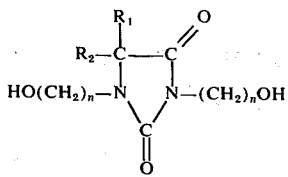

where $R_1$ and $R_2$ are H or the same or different hydrocarbon radicals selected from the group consisting of alkyl, aryl, alkaryl, aralkyl and heterocyclic radicals and n and n' are integers from 1 to 6.

5. The polymer of claim 3 in which di(2-carboxyethyl) dimethyl hydantoin is used.

6. The polymer of claim 4 in which di(2-hydroxyethyl) dimethyl hydantoin is used.

7. The polymer of claim 1 in which the modifying blocks comprise from about 2 to about 20 percent by weight of the block copolymer and said modifying blocks have an average degree of polymerization of from 2 to 20.

8. The block copolymer of claim 1 in the form of a dyed fiber.

9. The block copolymer of claim 1 in the form of a film.

* * * * *